(12) United States Patent
Masumura et al.

(10) Patent No.: US 12,148,418 B2
(45) Date of Patent: Nov. 19, 2024

(54) LEARNING DEVICE, VOICE RECOGNITION DEVICE, LEARNING METHOD, VOICE RECOGNITION METHOD, AND PROGRAM

(71) Applicant: NIPPON TELEGRAPH AND TELEPHONE CORPORATION, Tokyo (JP)

(72) Inventors: Ryo Masumura, Tokyo (JP); Tomohiro Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 613 days.

(21) Appl. No.: 17/269,705

(22) PCT Filed: Jun. 21, 2019

(86) PCT No.: PCT/JP2019/024826
§ 371 (c)(1),
(2) Date: Feb. 19, 2021

(87) PCT Pub. No.: WO2020/039728
PCT Pub. Date: Feb. 27, 2020

(65) Prior Publication Data
US 2021/0319783 A1     Oct. 14, 2021

(30) Foreign Application Priority Data
Aug. 21, 2018   (JP) ................................. 2018-154945

(51) Int. Cl.
*G10L 15/14*   (2006.01)
*G10L 15/02*   (2006.01)
(Continued)

(52) U.S. Cl.
CPC .............. *G10L 15/14* (2013.01); *G10L 15/02* (2013.01); *G10L 15/063* (2013.01); *G10L 15/16* (2013.01); *G10L 2015/025* (2013.01)

(58) Field of Classification Search
CPC ....... G10L 15/14; G10L 15/02; G10L 15/063; G10L 15/16; G10L 2015/025
See application file for complete search history.

(56) References Cited

U.S. PATENT DOCUMENTS 6,021,389 A * 2/2000 Protopapas ........... G10L 13/033
                                                                    704/271
6,085,160 A * 7/2000 D'hoore ................ G10L 15/005
                                                                    704/277
(Continued)

OTHER PUBLICATIONS

Zhang, Qing-Qing et al. "Development of a Mandarin-English Bilingual Speech Recognition System with Unified Acoustic Models." Journal of Information Science and Engineering 26.4 (2010): pp. 1491-1507 (Year: 2010).*

(Continued)

*Primary Examiner* — Thuykhanh Le

(57) ABSTRACT

A voice recognition device 10 includes: a phonological awareness feature amount extraction unit 11 that transforms an acoustic feature amount sequence of input voice into a phonological awareness feature amount sequence for the language 1 using a first model parameter group; a phonological awareness feature amount extraction unit 12 that transforms the acoustic feature amount sequence of the input voice into a phonological awareness feature amount sequence for the language 2 using a second model parameter group; a phonological recognition unit 13 that generates a posterior probability sequence from the acoustic feature amount sequence of the input voice, the phonological awareness feature amount sequence for the language 1, and the phonological awareness feature amount sequence for the (Continued)

language 2 using a third model parameter group; and a voice text transformation unit 14 that performs voice recognition based on the posterior probability sequence to output text of a voice recognition result.

6 Claims, 5 Drawing Sheets

(51) Int. Cl.
*G10L 15/06* (2013.01)
*G10L 15/16* (2006.01)

(56) References Cited

U.S. PATENT DOCUMENTS

| | | | | |
|---|---|---|---|---|
| 6,119,089 | A * | 9/2000 | Protopapas | G10L 13/033 704/278 |
| 7,149,688 | B2 * | 12/2006 | Schalkwyk | G10L 15/187 704/277 |
| 7,640,159 | B2 * | 12/2009 | Reich | G10L 15/187 704/250 |
| 7,912,721 | B2 * | 3/2011 | Dow | G10L 15/005 704/251 |
| 9,378,650 | B2 * | 6/2016 | Kadar | G09B 5/065 |
| 9,472,184 | B2 * | 10/2016 | Tjalve | G10L 15/005 |
| 9,928,754 | B2 * | 3/2018 | Yoon | G09B 19/04 |
| 10,283,142 | B1 * | 5/2019 | Yu | G10L 25/30 |
| 10,446,056 | B1 * | 10/2019 | Taylor | G09B 19/08 |
| 10,783,873 | B1 * | 9/2020 | Qian | G06N 3/08 |
| 10,937,444 | B1 * | 3/2021 | Suendermann-Oeft | G06N 3/045 |
| 2004/0098259 | A1 * | 5/2004 | Niedermair | G10L 15/07 704/254 |
| 2004/0236575 | A1 * | 11/2004 | Goronzy | G10L 15/08 704/E15.02 |
| 2005/0197835 | A1 * | 9/2005 | Reinhard | G10L 15/063 704/E15.02 |
| 2006/0020462 | A1 * | 1/2006 | Reich | G10L 15/187 704/E15.02 |
| 2006/0020463 | A1 * | 1/2006 | Reich | G10L 15/187 704/E15.02 |
| 2006/0053001 | A1 * | 3/2006 | Brockett | G06F 40/58 704/9 |
| 2006/0110711 | A1 * | 5/2006 | Julia | G09B 19/04 434/156 |
| 2006/0110712 | A1 * | 5/2006 | Julia | G09B 19/06 434/156 |
| 2006/0155538 | A1 * | 7/2006 | Higgins | G09B 19/06 704/246 |
| 2007/0015121 | A1 * | 1/2007 | Johnson | G09B 7/02 434/156 |
| 2007/0073532 | A1 * | 3/2007 | Brockett | G06F 40/58 704/9 |
| 2007/0294082 | A1 * | 12/2007 | Jouvet | G10L 15/005 704/E15.001 |
| 2009/0119105 | A1 * | 5/2009 | Kim | G10L 15/07 704/E15.014 |
| 2009/0222266 | A1 * | 9/2009 | Sakai | G10L 15/063 704/254 |
| 2010/0057462 | A1 * | 3/2010 | Herbig | G10L 15/02 704/256.1 |
| 2010/0145698 | A1 * | 6/2010 | Chen | G09B 19/06 704/256.1 |
| 2010/0211376 | A1 * | 8/2010 | Chen | G10L 15/187 704/250 |
| 2010/0299133 | A1 * | 11/2010 | Kopparapu | G06F 40/40 704/E15.003 |
| 2012/0245942 | A1 * | 9/2012 | Zechner | G10L 25/03 704/254 |
| 2014/0006029 | A1 * | 1/2014 | Stanley | G09B 19/06 704/254 |
| 2014/0205974 | A1 * | 7/2014 | Pellom | G10L 15/197 434/157 |
| 2014/0236598 | A1 * | 8/2014 | Fructuoso | H04M 1/00 704/249 |
| 2015/0161513 | A1 * | 6/2015 | Li | A61B 5/164 706/11 |
| 2015/0248898 | A1 * | 9/2015 | Loukina | G09B 19/04 704/239 |
| 2015/0371628 | A1 * | 12/2015 | Kreifeldt | G10L 15/02 704/254 |
| 2016/0180835 | A1 * | 6/2016 | Nissan | G10L 15/063 704/10 |
| 2016/0253999 | A1 * | 9/2016 | Kang | G10L 17/00 704/249 |
| 2018/0166069 | A1 * | 6/2018 | Chien | G10L 15/063 |
| 2018/0277100 | A1 * | 9/2018 | Cassagne | G09B 5/04 |
| 2019/0073997 | A1 * | 3/2019 | Millen | G10L 15/16 |
| 2019/0139540 | A1 * | 5/2019 | Kanda | G10L 15/19 |
| 2020/0219413 | A1 * | 7/2020 | Kobashikawa | G09B 5/04 |
| 2021/0134277 | A1 * | 5/2021 | Arora | G10L 15/02 |
| 2021/0241754 | A1 * | 8/2021 | Hiroya | G10L 21/007 |

OTHER PUBLICATIONS

Shen, Han-ping, et al. "Model generation of accented speech using model transformation and verification for bilingual speech recognition." ACM Transactions on Asian and Low-Resource Language Information Processing (TALLIP) 14.2 (2015): pp. 1-24 (Year: 2015).*

Hu, Wenping, et al. "Improved mispronunciation detection with deep neural network trained acoustic models and transfer learning based logistic regression classifiers." Speech Communication 67 (2015): pp. 154-166 (Year: 2015).*

Tu, Ming, et al. "Investigating the role of L1 in automatic pronunciation evaluation of L2 speech." arXiv preprint arXiv: 1807.01738 (Jul. 4, 2018), pp. 1-5 (Year: 2018).*

Kitashov, Fedor, et al. "Foreign English accent adjustment by learning phonetic patterns." arXiv preprint arXiv:1807.03625 (Jul. 9, 2018), pp. 1-5 (Year: 2018).*

Li, Longfei, et al. "Hybrid deep neural network—hidden markov model (dnn-hmm) based speech emotion recognition." 2013 Humaine association conference on affective computing and intelligent interaction. IEEE, 2013, pp. 312-317 (Year: 2013).*

Zhou, Pan, et al. "State-clustering based multiple deep neural networks modeling approach for speech recognition." IEEE/ACM Transactions on Audio, Speech, and Language Processing 23.4 (2015), pp. 631-642 (Year: 2015).*

Hinton et al. (2012) "Deep Neural Networks for Acoustic Modeling in Speech Recognition," IEEE Signal Processing Magazine, pp. 82-97.

Dahl et al. (2012) "Context-Dependent Pre-Trained Deep Neural Networks for Large-Vocabulary Speech Recognition," IEEE Transactions on Audio, Speech, and Language Processing, vol. 20, No. 1, pp. 30-42.

Kibishi et al. (2013) "Japanese English speech recognition by DNN-HMM," Reports on the Meeting of the Acoustical Society of Japan, pp. 173-174.

* cited by examiner

LEARNING DEVICE, VOICE RECOGNITION DEVICE, LEARNING METHOD, VOICE RECOGNITION METHOD, AND PROGRAM

CROSS-REFERENCE TO RELATED APPLICATIONS

This application is a U.S. 371 Application of International Patent Application No. PCT/JP2019/024826, filed on 21 Jun. 2019, which application claims priority to and the benefit of JP Application No. 2018-154945, filed on 21 Aug. 2018, the disclosures of which are hereby incorporated herein by reference in their entireties.

TECHNICAL FIELD

The present invention relates to a learning device, a voice recognition device, a learning method, a voice recognition method and a program.

BACKGROUND ART

With the advance of internationalization, there are increasing opportunities for people to speak languages other than their native language. In particular, English is used as a global common language, and there are various scenes where people speak English throughout the world. Hereinafter, when a language is targeted, a speaker whose native language is that language is referred to as a native speaker, and a speaker whose native language is not that language is referred to as a non-native speaker. In addition, voice data uttered by a native speaker in that language is referred to as native voice data, and voice data uttered by a non-native speaker in that language is referred to as non-native voice data.

Specific scenes where a non-native speaker appears include international conferences and the like. In international conferences, it has become common for non-native speakers of English to communicate with each other in English. However, since the pronunciation of non-native speakers is largely different from the pronunciation of native speakers, their communication may be difficult. In particular, when non-native speakers who have different native languages have a conversation, their communication may be difficult. For example, it is known that it is difficult for Indians to hear English spoken by Japanese, and it is difficult for Japanese to hear English spoken by Indians. So, when non-native speakers of a specific language have communication, communication is expected to be facilitated using voice recognition. That is, even when it is difficult to hear voice as it is, if it can be transformed into text, it can be expected that the utterance content can be easily understand. For that purpose, it is necessary to sophisticate voice recognition for non-native speakers.

Since non-native voice (voice uttered by a non-native speaker for a specific language) is largely different in pronunciation from native voice (voice uttered by a native speaker), it is known that a voice recognition system build for native speakers cannot obtain sufficient performance for voice recognition for non-native speakers. Here, a voice recognition system build for native speakers is a systems using an acoustic model learned from native voice. An acoustic model is a statistical model that maps the relationship between voice and phonemes (basic elements of voice).

Specifically, an acoustic model is a model that defines the probability $P(S|X, \theta)$ that a phoneme sequence S is output when specific voice data X is input. Note that $\theta$ is a model parameter group that is learned in advance from voice data.

An acoustic model used in voice recognition systems in recent years is an acoustic model using a deep neural network (including convolutional neural networks, recurrent neural networks and the like) (hereinafter referred to as "DNN acoustic model"). A DNN acoustic model is a well-known technique, and the details such as a representative model structure and calculation method are described in, for example, Non-Patent Literature 1 and Non-Patent Literature 2.

From the background described above, it is effective to use an acoustic model learned from non-native voice data for a voice recognition system for non-native speakers. However, it is difficult to collect a large amount of non-native voice data in order to build an acoustic model for non-native speakers. So, an acoustic model is often learned using non-native voice data and native voice data together. For example, Non-Patent Literature 3 describes a technique for learning a DNN acoustic model using native voice data and non-native voice data together.

The technique described in Non-Patent Literature 3 as a background art will be described in further detail.

<Learning of DNN Acoustic Model>

Input and output in learning a DNN acoustic model are as follows:

Input: D=non-native voice data set+native voice data set

Output: $\theta$=a model parameter group of a DNN acoustic model for non-natives The voice data set D is data set including one or more pairs (S, X) of voice data X and its phoneme sequence S. In learning, the model parameter group $\theta$ is determined based on Formula (1) below:

[Formula 1]

$$\hat{\Theta} = \underset{\Theta}{\mathrm{argmax}} \prod_{(s,x) \in D} P(S | X, \Theta) \qquad \text{Formula (1)}$$

where $\hat{\Theta}$ indicates a determined parameter.

<Voice Recognition for Non-Native Speakers>

Input and output in voice recognition for non-native speakers are as follows:

Input: X=non-native voice, and a DNN acoustic model having a model parameter group $\theta$ Output: O=a posterior probability sequence for phonemes Voice recognition is performed based on the output (the posterior probability sequence O). A method for performing voice recognition based on the posterior probability sequence O is well known, and is described in, for example, Non-Patent Literature 1 and Non-Patent Literature 2 described above, and therefore the explanation is omitted.

CITATION LIST

Non-Patent Literature

Non-Patent Literature 1: G. Hinton, L. Deng, D. Yu, G. Dahl, A. rahman Mohamed, N. Jaitly, A. Senior, V. Vanhoucke, P. Nguyen, B. Kingsbury, and T. Sainath, "Deep neural networks for acoustic modeling in speech recognition: The shared views of four research groups", IEEE Signal Processing Magazine, pp. 82-97, 2012.

Non-Patent Literature 2: G. E. Dahl, D. Yu, L. Deng, and A. Acero, "Context-dependent pretrained deep neural networks for large-vocabulary speech recognition", IEEE transactions on Audio, Speech and Language Processing, vol. 20, pp. 30-42, 2012.

Non-Patent Literature 3: H. Kibishi and S. Nakagawa, "DNN-HMM based speech recognition for English spoken by Japanese", Proceedings of the Acoustical Society of Japan, 2013.

SUMMARY OF THE INVENTION

Technical Problem

The technique described in Non-Patent Literature 3 described above is a technique using a model parameter group that is learned so as to maximize voice recognition performance (phoneme identification performance) for both non-native voice data and native voice data. Therefore, the technique described in Non-Patent Literature 3 can obtain high voice recognition performance when the pronunciation of non-native voice targeted for voice recognition is close to the pronunciation of native voice. On the other hand, the technique described in Non-Patent Literature 3 has a problem of low voice recognition performance for non-native voice when the pronunciation of non-native voice targeted for voice recognition is largely different from the pronunciation of native voice.

For example, when non-native voice uttered by a Japanese in English is targeted for voice recognition and if it is non-native voice by a speaker who has studied English sufficiently and can pronounce closely to natives, high voice recognition performance can be achieved by the technique described in Non-Patent Literature 3. On the other hand, in the case of non-native voice by a speaker who has just started studying English and has pronunciation like a connection of Japanese phonemes, high voice recognition performance cannot be achieved by the technique described in Non-Patent Literature 3.

Note that the technique described in Non-Patent Literature 3 cannot utilize voice data of non-native speakers in their native language for learning an acoustic model. For example, when building an acoustic model for English spoken by Japanese, the technique described in Non-Patent Literature 3 cannot utilize voice data in Japanese spoken by Japanese. This is because a phoneme set included in voice data of non-native speakers in their native language is different from a phoneme set in a language targeted for voice recognition and therefore the voice data of non-native speakers in their native language is not suitable as learning data for the acoustic model.

An object of the present invention made in view of the above problems is to provide a learning device, a voice recognition device, a learning method, a voice recognition method and a program that can improve voice recognition performance even when the pronunciation of non-native voice data targeted for voice recognition is largely different from the pronunciation of native voice data.

Means for Solving the Problem

In order to solve the above problems, a learning device according to the present invention is a learning device for learning a parameter used for voice recognition of input voice, including: a first model parameter group learning unit that learns a first model parameter group for transforming the input voice into a phonological awareness feature amount sequence for a first language, which is a sequence of feature amounts including information for identifying a phoneme in the first language, using a voice data set uttered in the first language by a speaker whose native language is the first language; a second model parameter group learning unit that learns a second model parameter group for transforming the input voice into a phonological awareness feature amount sequence for a second language, which is a sequence of feature amounts including information for identifying a phoneme in the second language, using a voice data set uttered in the second language by a speaker whose native language is the second language; and a third model parameter group learning unit that learns a third model parameter group for generating a posterior probability sequence for phonemes in the first language from the input voice using the first model parameter group, the second model parameter group, and a voice data set uttered in the first language by a speaker whose native language is the second language.

In order to solve the above problems, a voice recognition device according to the present invention is a voice recognition device for performing voice recognition of the input voice using the first to third model parameter groups learned by the learning device described above, the voice recognition device including: a first phonological awareness feature amount extraction unit that transforms an acoustic feature amount sequence of the input voice into the phonological awareness feature amount sequence for the first language using the first model parameter group; a second phonological awareness feature amount extraction unit that transforms the acoustic feature amount sequence of the input voice into the phonological awareness feature amount sequence for the second language using the second model parameter group; a phonological recognition unit that generates the posterior probability sequence from the acoustic feature amount sequence of the input voice, the phonological awareness feature amount sequence for the first language, and the phonological awareness feature amount sequence for the second language using the third model parameter group; and a voice text transformation unit that performs voice recognition based on the posterior probability sequence to output text of a voice recognition result.

In order to solve the above problems, a learning method according to the present invention is a learning method in a learning device for learning a parameter used for voice recognition of input voice, including: a step of learning a first model parameter group for transforming the input voice into a phonological awareness feature amount sequence for a first language, which is a sequence of feature amounts including information for identifying a phoneme in the first language, using a voice data set uttered in the first language by a speaker whose native language is the first language; a step of learning a second model parameter group for transforming the input voice into a phonological awareness feature amount sequence for a second language, which is a sequence of feature amounts including information for identifying a phoneme in the second language, using a voice data set uttered in the second language by a speaker whose native language is the second language; and a step of learning a third model parameter group for generating a posterior probability sequence for phonemes in the first language from the input voice using the first model parameter group, the second model parameter group, and a voice data set uttered in the first language by a speaker whose native language is the second language.

In order to solve the above problems, a voice recognition method according to the present invention is a voice recognition method in a voice recognition device for performing voice recognition of the input voice using the first to third model parameter groups learned by the learning method according to claim 3, the voice recognition method including: a step of transforming an acoustic feature amount sequence of the input voice into the phonological awareness feature amount sequence for the first language using the first model parameter group; a step of transforming the acoustic feature amount sequence of the input voice into the phonological awareness feature amount sequence for the second language using the second model parameter group; a step of generating the posterior probability sequence from the acoustic feature amount sequence of the input voice, the phonological awareness feature amount sequence for the first language, and the phonological awareness feature amount sequence for the second language using the third model parameter group; and a step of performing voice recognition based on the posterior probability sequence to output text of a voice recognition result.

In order to solve the above problems, a program according to the present invention causes a computer to function as the learning device described above.

In order to solve the above problems, a program according to the present invention causes a computer to function as the voice recognition device described above.

Effects of the Invention

According to the learning device, the voice recognition device, the learning method, the voice recognition method and the program related to the present invention, voice recognition performance can be improved even when the pronunciation of non-native voice data targeted for voice recognition is largely different from the pronunciation of native voice data.

DETAILED DESCRIPTION OF THE INVENTION

Figure 1:
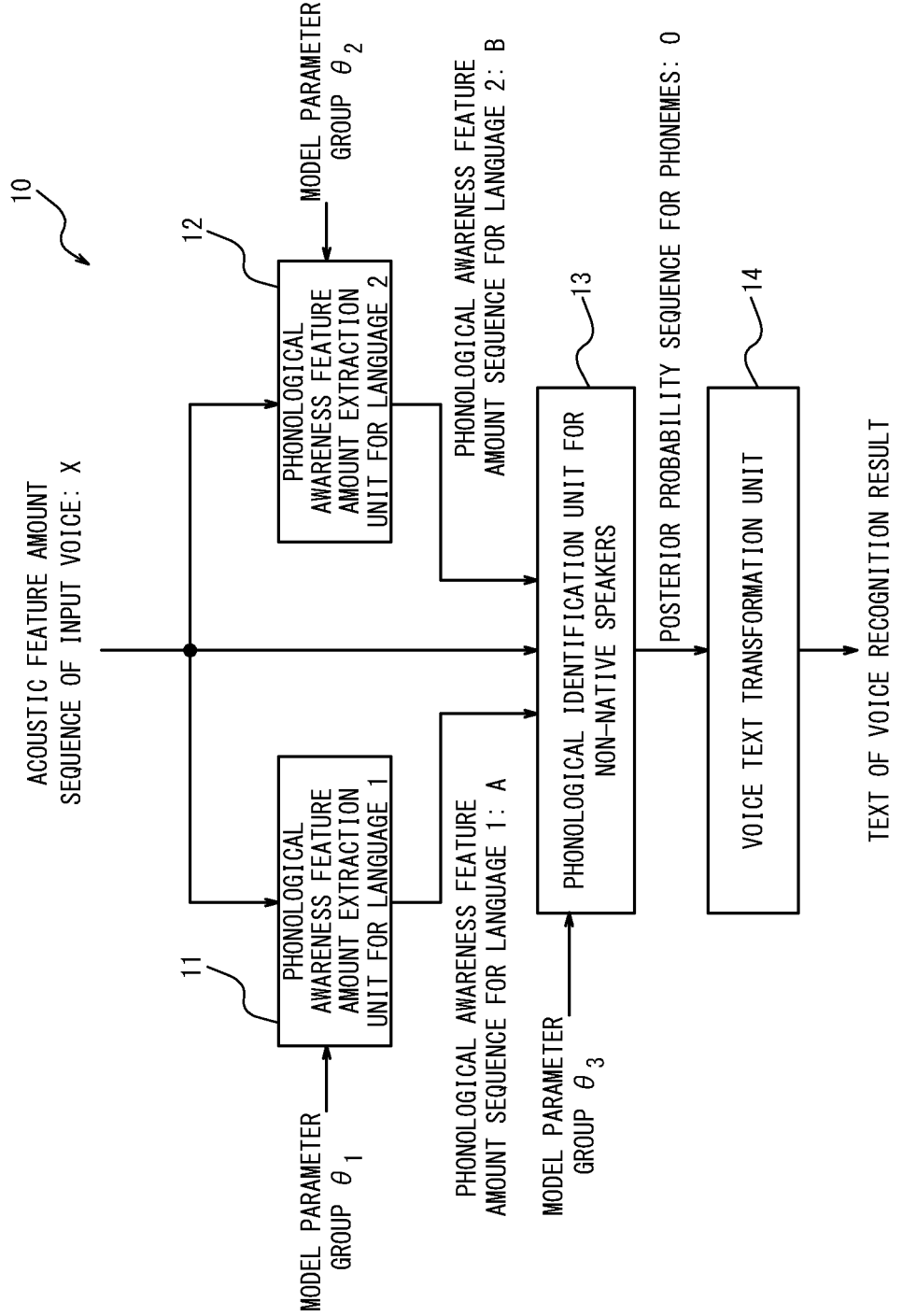
FIG. 1 is a diagram showing an example configuration of a voice recognition device according to an embodiment of the present invention.

Embodiments of the present invention will be described below with reference to the drawings. In each drawing, the same reference numerals indicate the same or equivalent components.

FIG. 1 is a diagram showing an example configuration of a voice recognition device 10 according to an embodiment of the present invention. The voice recognition device 10 according to this embodiment receives voice uttered by a non-native speaker for a language targeted for voice recognition as input voice, and outputs text of a voice recognition result for the input voice.

Two languages (a language 1 and a language 2) and three data sets (a data set A, a data set B, and a data set C) are defined below.

The language 1 as a first language is a language targeted for voice recognition that is uttered by a non-native speaker. For example, in an example of performing voice recognition of voice uttered by a Japanese in English, the language 1 is English. The language 2 as a second language is the native language of a non-native speaker for a language targeted for voice recognition. In the above example of performing voice recognition of voice uttered by a Japanese in English, the language 2 is Japanese.

The data set A is a voice data set that is uttered in the language 1 by speakers whose native language is the language 1. The data set B is a voice data set that is uttered in the language 2 by speakers whose native language is the language 2. The data set C is a voice data set that is uttered in the language 1 by speakers whose native language is the language 2. That is, the data set C is a non-native voice data set.

The voice recognition device 10 shown in FIG. 1 comprises a phonological awareness feature amount extraction unit 11 for the language 1, a phonological awareness feature amount extraction unit 12 for the language 2, a phonological identification unit 13 for non-native speakers, and a voice text transformation unit 14.

The phonological awareness feature amount extraction unit 11 for the language 1 as a first phonological awareness feature amount extraction unit transforms an acoustic feature amount sequence X of the input voice into a phonological awareness feature amount sequence A for the language 1 as a phonological awareness feature amount sequence for the first language using a model parameter group $\theta_1$ as a first model parameter group.

The phonological awareness feature amount extraction unit 12 for the language 2 as a second phonological awareness feature amount extraction unit transforms an acoustic feature amount sequence X of the input voice into a phonological awareness feature amount sequence B for the language 2 as a phonological awareness feature amount sequence for the second language using a model parameter group $\theta_2$ as a second model parameter group.

The phonological identification unit 13 for non-native speakers as a phonological recognition unit generates a posterior probability sequence O for phonemes of the language 1 from the acoustic feature amount sequence X of the input voice, the phonological awareness feature amount sequence A for the language 1, and the phonological awareness feature amount sequence B for the language 2 using a model parameter group $\theta_3$ as a third model parameter group.

The voice text transformation unit 14 performs voice recognition based on the posterior probability sequence O to output text of a voice recognition result.

Note that the input voice is transformed into the acoustic feature amount sequence X, and is input to the voice recognition device 10. Anything can be used as an acoustic feature amount, for example, anything can be used such as mel-frequency cepstrum coefficients, transformed mel-frequency cepstrum coefficients such as normalized ones, or a combination of a plurality of temporally preceding and following feature amounts. An acoustic feature amount is extracted at short time intervals (e.g., every 0.01 seconds), and voice can be treated as a sequence of acoustic feature amounts (an acoustic feature amount sequence). Hereinafter, the acoustic feature amount sequence X is expressed as $X=(x_1, \ldots, x_T)$. Note that $x_t$ is the acoustic feature amount of the t-th frame.

A phonological awareness feature amount is a feature amount including information for identifying a phoneme. Specifically, a phonological awareness feature amount is a feature amount that can be extracted using a model that is learned to discriminate a phoneme.

Operation of each unit provided in the voice recognition device 10 will be described below in further detail. First, the phonological awareness feature amount extraction unit 11 for the language 1 will be described.

The phonological awareness feature amount extraction unit 11 for the language 1 receives the acoustic feature amount sequence $X=(x_1, \ldots, x_T)$ of the input voice and the model parameter group $\theta_1$ as input, and outputs the phonological awareness feature amount sequence $A=(a_1, \ldots, a_T)$ for the language 1. The phonological awareness feature amount extraction unit 11 for the language 1 transforms the acoustic feature amount sequence $X=(x_1, \ldots, x_T)$ of the input voice into the phonological awareness feature amount sequence $A=(a_1, \ldots, a_T)$ for the language 1 using the model parameter group $\theta_1$. The acoustic feature amount sequence X and the phonological awareness feature amount sequence A for the language 1 both have a length of T. The phonological awareness feature amount extraction unit 11 for the language 1 transforms the acoustic feature amount sequence X into the phonological awareness feature amount sequence A for the language 1 according to Formula (2) below:

[Formula 2]

$$A = DNN(X; \theta_1) \qquad \text{Formula (2)}$$

DNN( ) is a non-linear transform function using the DNN described above, and various configurations can be used. For example, DNN( ) can be implemented using a 3-layer neural network. The model parameter group $\theta_1$ is a model parameter group estimated by learning described later.

Next, the phonological awareness feature amount extraction unit 12 for the language 2 will be described.

The phonological awareness feature amount extraction unit 12 for the language 2 receives the acoustic feature amount sequence $X=(x_1, \ldots, x_T)$ of the input voice and the model parameter group $\theta_2$ as input, and outputs the phonological awareness feature amount sequence $B=(b_1, \ldots, b_T)$ for the language 2. The phonological awareness feature amount extraction unit 12 for the language 2 transforms the acoustic feature amount sequence $X=(x_1, \ldots, x_T)$ of the input voice into the phonological awareness feature amount sequence $B=(b_1, \ldots, b_T)$ for the language 2 using the model parameter group $\theta_2$. Here, the acoustic feature amount sequence X and the phonological awareness feature amount sequence B for the language 2 both have a length of T. The phonological awareness feature amount extraction unit 12 for the language 2 transforms the acoustic feature amount sequence X into the phonological awareness feature amount sequence B for the language 2 according to Formula (3) below:

[Formula 3]

$$B = DNN(X; \theta_2) \qquad \text{Formula (3)}$$

DNN( ) is a non-linear transform function using the DNN described above, and various configurations can be used. For example, DNN( ) can be implemented using a 3-layer neural network. The model parameter group $\theta_2$ is a model parameter group estimated by learning described later.

Next, the phonological identification unit 13 for non-native speakers will be described.

The phonological identification unit 13 for non-native speakers receives, as input, the acoustic feature amount sequence $X=(x_1, \ldots, x_T)$ of the input voice, the phonological awareness feature amount sequence $A=(a_1, \ldots, a_T)$ for the language 1, the phonological awareness feature amount sequence $B=(b_1, \ldots, b_T)$ for the language 2, and the model parameter group $\theta_3$, and outputs the posterior probability sequence $O=(o_1, \ldots, o_T)$ for phonemes. The phonological identification unit 13 for non-native speakers generates the posterior probability sequence $O=(o_1, \ldots, o_T)$ for phonemes from the acoustic feature amount sequence $X=(x_1, \ldots, x_T)$ of the input voice, the phonological awareness feature amount sequence $A=(a_1, \ldots, a_T)$ for the language 1, and the phonological awareness feature amount sequence $B=(b_1, \ldots, b_T)$ for the language 2 using the model parameter group $\theta_3$.

Specifically, the phonological identification unit 13 for non-native speakers first creates a new vector sequence $C=(c_1, \ldots, c_T)$ from each input feature amount sequence. Here, the phonological identification unit 13 for non-native speakers generates $c_t$ according to Formula (4) below.

[Formula 4]

$$c_t = [x_t^T, a_t^T, b_t^T]^T \qquad \text{Formula (4)}$$

In Formula (4), T is the transpose symbol. That is, $c_t$ is expressed as a vector in which $x_t$, $a_t$ and $b_t$ are lined up.

The phonological identification unit 13 for non-native speakers generates the posterior probability sequence O for phonemes from the vector sequence C according to Formula (5) below:

[Formula 5]

$$O = \text{INPUTto Posteriorgram}(C; \theta_3) \qquad \text{Formula (5)}$$

INPUTtoPosteriorgram( ) is a non-linear transform function using the DNN described above, and various configurations can be used. For example, INPUTtoPosteriorgram( ) is a 5-layer neural network, and can be implemented by using a softmax function as the final layer. The model parameter group $\theta_3$ is a model parameter group estimated by learning described later.

Next, the voice text transformation unit 14 will be described.

The voice text transformation unit 14 receives the posterior probability sequence $O=(o_1, \ldots, o_T)$ for phonemes as input, and outputs text of the voice recognition result. The voice text transformation unit 14 performs voice recognition based on the posterior probability sequence $O=(o_w, \ldots, o_T)$ for phonemes to output text of the voice recognition result. A method of voice recognition based on the posterior probability sequence O for phonemes is well known, for example, it is described in Non-Patent Literature 1 and Non-Patent Literature 2 described above, so the explanation is omitted.

Figure 2:
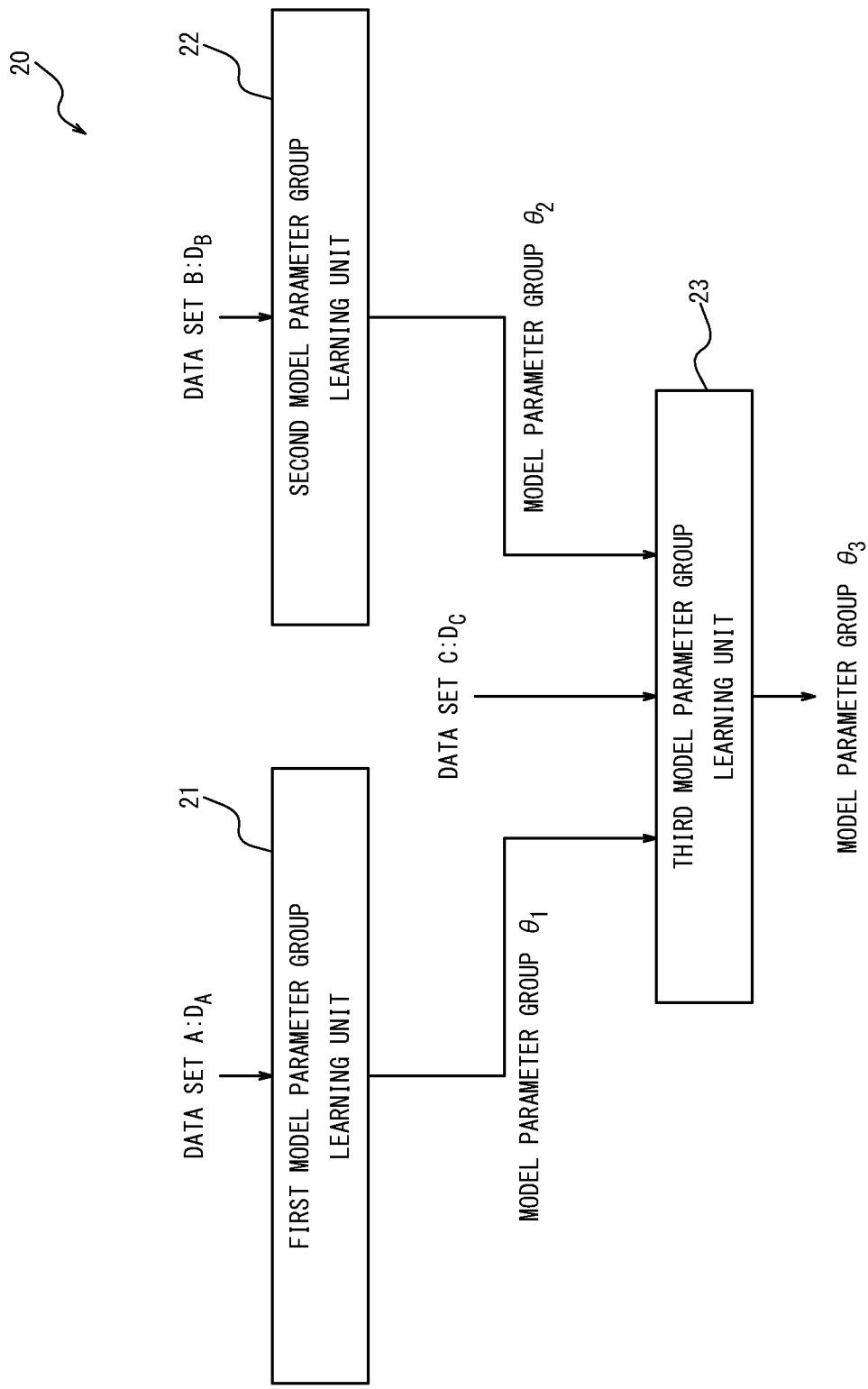
FIG. 2 is a diagram showing an example configuration of a learning device according to an embodiment of the present invention.

FIG. 2 is a diagram showing an example configuration of a learning device 20 according to an embodiment of the present invention. The learning device 20 according to this embodiment learns the model parameter groups $\theta_1$-$\theta_3$ that are used in the voice recognition device 10 described with reference to FIG. 1.

The learning device 20 shown in FIG. 2 comprises a first model parameter group learning unit 21, a second model parameter group learning unit 22, and a third model parameter group learning unit 23.

The first model parameter group learning unit 21 receives the data set A as input, and learns the model parameter group $\theta_1$ used in the phonological awareness feature amount extraction unit 11 for the language 1 described above. That is, the first model parameter group learning unit 21 learns, from the data set A, the model parameter group $\theta_1$ for transforming the input voice into the phonological awareness feature amount sequence A for the language 1 (a sequence of feature amounts including information for identifying phonemes in the language 1).

The second model parameter group learning unit 22 receives the data set B as input, and learns the model parameter group $\theta_2$ used in the phonological awareness feature amount extraction unit 12 for the language 2 described above. That is, the second model parameter group learning unit 22 learns, from the data set B, the model parameter group $\theta_2$ for transforming the input voice into the phonological awareness feature amount sequence B for the language 2 (a sequence of feature amounts including information for identifying phonemes in the language 2).

The third model parameter group learning unit 23 learns the model parameter group $\theta_3$ for generating the posterior probability sequence for phonemes from the input voice in the phonological identification unit 13 for non-native speakers described above using the model parameter group $\theta_1$, the model parameter group $\theta_2$, and the data set C.

Operation of each unit provided in the learning device 20 will be described below in further detail. First, the first model parameter group learning unit 21 will be described.

The first model parameter group learning unit 21 receives the data set A: $D_A$ as input, and outputs the model parameter group $\theta_1$. The first model parameter group learning unit 21 learns the model parameter group $\theta_1$ from the data set A (the data set $D_A$). The first model parameter group learning unit 21 constructs a network obtained by concatenating a network for transforming the phonological awareness feature amount sequence A=($a_1, \ldots, a_T$) for the language 1 into a posterior probability sequence O=($o_1, \ldots, o_T$). A specific structure of such a network is shown in FIG. 3.

Figure 3:
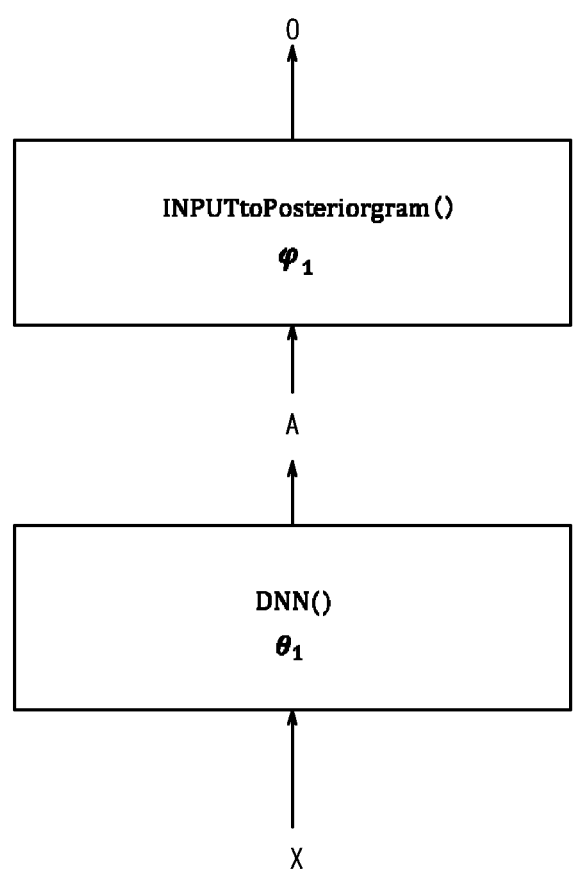
FIG. 3 is a diagram for explaining learning of a model parameter group by a first model parameter group learning unit shown in FIG. 2.

The network structure shown in FIG. 3 is expressed by Formula (6) below:

[Formula 6]

$$O=\text{INPUTtoPosteriorgram}(A;\varphi_1)=\text{INPUTtoPosteriorgram}(DNN(X;\theta_1);\varphi_1) \quad \text{Formula (6)}$$

INPUTtoPosteriorgram( ) is a non-linear transform function using the DNN described above, and various configurations can be used. For example, INPUTtoPosteriorgram( ) is a 3-layer neural network, and can be implemented by using a softmax function as the final layer. $\varphi_1$ is a model parameter group estimated by learning. The first model parameter group learning unit 21 learns the model parameter group $\theta_1$ according to Formula (7) below:

[Formula 7]

$$\hat{\theta}_1, \hat{\varphi}_1 = \underset{\theta_1, \varphi_1}{\operatorname{argmax}} \prod_{(S,X) \in D_\lambda} P(S \mid X, \theta_1, \varphi_1) \quad \text{Formula (7)}$$

$$P(S \mid X, \theta_1, \varphi_1) = \prod_{i=j}^{r} o_{t,s}$$

Note that hereinafter $\theta$ with the symbol ^ means $\theta$ satisfying the right side (estimated by the right side). $o_{t,s}$ denotes the value of a dimension corresponding to the t-th phoneme in the phoneme sequence S in $o_t$. The learning according to Formula (7) can use, for example, a backpropagation method that is a well-known method.

Next, the second model parameter group learning unit 22 will be described.

The second model parameter group learning unit 22 receives the data set B: $D_B$ as input, and outputs the model parameter group $\theta_2$. The second model parameter group learning unit 22 learns the model parameter group $\theta_2$ from the data set B (the data set $D_B$). The second model parameter group learning unit 22 constructs a network obtained by concatenating a network for transforming the phonological awareness feature amount sequence B=($b_1, \ldots, b_T$) for the language 2 into a posterior probability sequence O=($o_1, \ldots, o_T$). Such a network structure is expressed by Formula (8) below:

[Formula 8]

$$O=\text{INPUTtoPosteriorgram}(B;\varphi_2)=\text{INPUTtoPosteriorgram}(DNN(X;\theta_2);\varphi_2) \quad \text{Formula (8)}$$

INPUTtoPosteriorgram( ) is a non-linear transform function using the DNN described above, and various configurations can be used. For example, INPUTtoPosteriorgram( ) is a 3-layer neural network, and can be implemented by using a softmax function as the final layer. $\varphi_2$ is a model parameter group estimated by learning. The second model parameter group learning unit 22 learns the model parameter group $\theta_2$ according to Formula (9) below.

[Formula 9]

$$\hat{\theta}_2, \hat{\varphi}_2 = \underset{\theta_2, \varphi_2}{\operatorname{argmax}} \prod_{(S,X) \in D_\lambda} P(S \mid X, \theta_2, \varphi_2) \quad \text{Formula (9)}$$

$$P(S \mid X, \theta_2, \varphi_2) = \prod_{i=j}^{T} o_{t,s}$$

Here, $o_{t,s}$ denotes the value of a dimension corresponding to the t-th phoneme in the phoneme sequence S in $o_t$. The learning according to Formula (9) can use, for example, a backpropagation method that is a well-known method.

Next, the third model parameter group learning unit 23 will be described.

The third model parameter group learning unit 23 receives the data set C: $D_C$, the model parameter group $\theta_1$, and the model parameter group $\theta_2$ as input, and outputs the model parameter group $\theta_3$. The third model parameter group learning unit 23 learns the model parameter group $\theta_3$ from the data set C (the data set $D_C$) using the model parameter group $\theta_1$ and the model parameter group $\theta_2$. Specifically, the third model parameter group learning unit 23 first transforms in advance the voice data X in the data set $D_C$ into a vector sequence C using the determined model parameter group $\hat{\theta}_1$ and model parameter group $\hat{\theta}_2$. The third model parameter group learning unit 23 transforms it into the vector sequence C according to Formula (10) below:

[Formula 10]

$$A=(a_1, \ldots, a_T)=DNN(X;\hat{\theta}_1)$$

$$B=(b_1, \ldots, b_T)=DNN(X;\hat{\theta}_2)$$

$$C=(c_1, \ldots, c_T)$$

$$c_t=[x_t^T, a_t^T, b_t^T]^T \quad \text{Formula (10)}$$

The third model parameter group learning unit 23 learns the model parameter group $\theta_3$ using the created vector sequence C. The third model parameter group learning unit 23 learns the model parameter group $\theta_3$ according to Formula (11) below.

[Formula 11]

$$\hat{\theta}_3 = \underset{\theta_2}{\operatorname{argmax}} \prod_{(S,C) \in D_C} P(S \mid C, \theta_3) \quad \text{Formula (11)}$$

$$P(S \mid C, \theta_3) = \prod_{i=1}^{T} o_{t,s}$$

Here, $o_{t,s}$ denotes the value of a dimension corresponding to the t-th phoneme in the phoneme sequence S in $o_t$. The learning according to Formula (11) can use, for example, a backpropagation method that is a well-known method.

Note that although this embodiment describes the voice recognition device 10 and the learning device 20 separately, these devices may be formed integrally. Accordingly, the voice recognition device 10 may comprise each unit provided in the learning device 20. In addition, the learning device 20 may comprises each unit provided in the voice recognition device 10.

Figure 4:
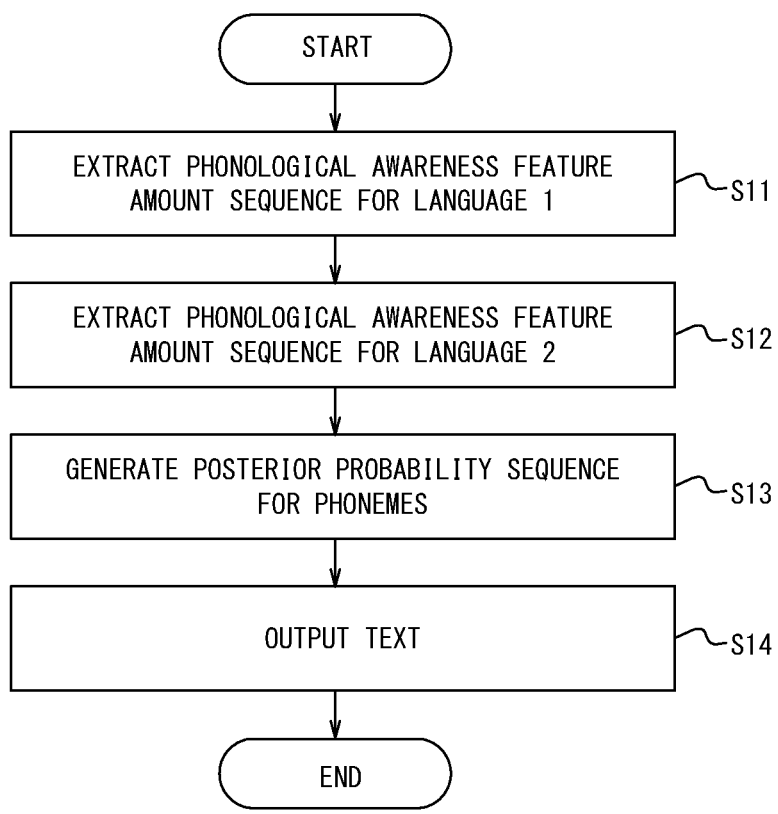
FIG. 4 is a flowchart for explaining a voice recognition method in the voice recognition device shown in FIG. 1.

Next, a voice recognition method in the voice recognition device 10 according to this embodiment will be described with reference to the flowchart shown in FIG. 4.

The phonological awareness feature amount extraction unit 11 for the language 1 transforms the acoustic feature sequence X of the input voice into the phonological awareness feature amount sequence $A=(a_1, \ldots, a_T)$ for the language 1 using the model parameter group $\theta_1$ (step S11). Specifically, the phonological awareness feature amount extraction unit 11 for the language 1 transforms the acoustic feature sequence X of the input voice into the phonological awareness feature amount sequence $A=(a_1, \ldots, a_T)$ for the language 1 according to Formula (2) described above.

The phonological awareness feature amount extraction unit 12 for the language 2 transforms the acoustic feature sequence X of the input voice into the phonological awareness feature amount sequence $B=(b_1, \ldots, b_T)$ for the language 2 using the model parameter group $\theta_2$ (step S12). Specifically, the phonological awareness feature amount extraction unit 12 for the language 2 transforms the acoustic feature sequence X of the input voice into the phonological awareness feature amount sequence $B=(b_1, \ldots, b_T)$ for the language 2 according to Formula (3) described above.

Note that either the processing in step S11 or the processing in step S12 may be performed first, or they may be performed in parallel.

The phonological identification unit 13 for non-native speakers generates the posterior probability sequence $O=(o_1, \ldots, o_T)$ for phonemes from the acoustic feature amount sequence $X=(x_1, \ldots, x_T)$ of the input voice, the phonological awareness feature amount sequence $A=(a_1, \ldots, a_T)$ for the language 1, and the phonological awareness feature amount sequence $B=(b_1, \ldots, b_T)$ for the language 2 using the model parameter group $\theta_3$ (step S13). Specifically, the phonological identification unit 13 for non-native speakers generates the posterior probability sequence $O=(o_1, \ldots, o_T)$ according to Formula (5) described above.

The voice text transformation unit 14 performs voice recognition based on the posterior probability sequence $O=(o_1, \ldots, o_T)$ to output text of the voice recognition result (step S14).

Figure 5:
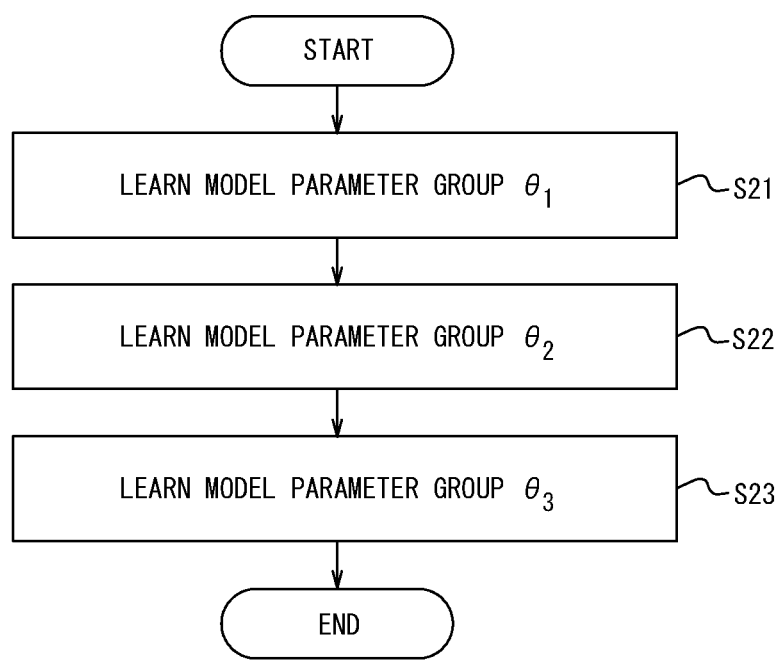
FIG. 5 is a flowchart for explaining a learning method in the learning device shown in FIG. 2.

Next, the learning method in the learning device 20 according to this embodiment is described with reference to the flowchart shown in FIG. 5.

The first model parameter group learning unit 21 learns the model parameter group $\theta_1$ for transforming the input voice into the phonological awareness feature amount sequence A for the language 1 using the data set $D_A$ (the voice data set uttered in the language 1 by speakers whose native language is the language 1) (step S21). Specifically, the first model parameter group learning unit 21 learns the model parameter group $\theta_1$ according to Formula (7) described above.

The second model parameter group learning unit 22 learns the model parameter group $\theta_2$ for transforming the input voice into the phonological awareness feature amount sequence B for the language 2 using the data set $D_B$ (the voice data set uttered in the language 2 by speakers whose native language is the language 2) (step S22). Specifically, the second model parameter group learning unit 22 learns the model parameter group $\theta_2$ according to Formula (9) described above.

Note that either the processing in step S21 or the processing in step S22 may be performed first, or they may be performed in parallel.

The third model parameter group learning unit 23 learns the model parameter group $\theta_3$ for generating the posterior probability sequence O for phonemes from the input voice using the model parameter group $\theta_1$, the model parameter group $\theta_2$, and the data set $D_C$ (the voice data set uttered in the first language by speakers whose native language is the language 2) (step S23). Specifically, the third model parameter group learning unit 23 learns the model parameter group $\theta_3$ according to Formula (11) described above.

Thus, in this embodiment, the voice recognition device 10 generates the posterior probability sequence O for phonemes from the acoustic feature amount sequence X of the input voice, the phonological awareness feature amount sequence A for the language 1, and the phonological awareness feature amount sequence B for the language 2 using the model parameter group $\theta_3$. Here, the model parameter group $\theta_3$ is learned from the voice data set uttered in the language 1 by speakers whose native language is the language 2, that is, a non-native voice data set. Therefore, when non-native voice is used as the input voice, the voice recognition device 10 can obtain high voice recognition performance.

Furthermore, in this embodiment, the model parameter group $\theta_2$ learned from the voice data set uttered in the language 2 by speakers whose native language is the language 2 is also used in learning the model parameter group $\theta_3$. Therefore, even when the pronunciation of non-native voice is largely different from the pronunciation of native voice, and is pronunciation close to the native language of the non-native speaker, high voice recognition performance can be obtained. Accordingly, even when the pronunciation of non-native voice data targeted for voice recognition is largely different from the pronunciation of native voice data, voice recognition performance can be improved.

In addition, in this embodiment, the model parameter group $\theta_2$ learned from the voice data set uttered in the language 1 by speakers whose native language is the language 1 is also used in learning the model parameter group $\theta_3$. Therefore, high voice recognition performance can also be obtained for native voice and non-native voice with pronunciation close to the pronunciation of native voice.

Although the voice recognition device 10 and the learning device 20 have been described above, a computer may be used to function as the voice recognition device 10 and the learning device 20. Such a computer can be implemented by storing, in a storage unit of the computer, a program in which the processing contents for implementing each function of the voice recognition device 10 and the learning device 20 are written, and causing a CPU of the computer to read and execute this program.

Alternatively, the program may be recorded in a computer readable recording medium. If such a recording medium is used, the program can be installed in the computer. Here, the recording medium in which the program is recorded may be a non-transitory recording medium. Although the non-transitory recording medium is not limited particularly, it may be, for example, a recording medium such as a CD-ROM and a DVD-ROM.

Although the above embodiments have been described as representative examples, it is apparent to those skilled in the art that many modifications and replacements may be made within the spirit and scope of the present invention. Accordingly, the present invention is not to be understood as being limited by the above embodiments, and various variants and modifications may be made without departing from the scope of the claims. For example, a plurality of functional blocks depicted in the configuration diagrams of the embodiments may be combined into one, or one functional block may be divided.

REFERENCE SIGNS LIST

10 Voice recognition device
11 Phonological awareness feature amount extraction unit for language 1 (first phonological awareness feature amount extraction unit)
12 phonological awareness feature amount extraction unit for language 2 (second phonological awareness feature amount extraction unit)
13 Phonological identification unit for non-native speakers (phonological recognition unit)
14 Voice text transformation unit
20 Learning device
21 First model parameter group learning unit
22 Second model parameter group learning unit
23 Second model parameter group learning unit

The invention claimed is:

1. A device for learning parameters associated with deep neural networks used for automated voice recognition, comprising:
at least one processor; and
at least one memory including instructions that, when executed by the at least one processor, cause the device to:
receive, by a first model parameter group learning unit, a first voice data set uttered in a first language by a first speaker whose native language is the first language;
generate, by the first model parameter group learning unit, a first model parameter group associated with a first deep neural network;
use the first model parameter group to update the first deep neural network;
use the updated first deep neural network to transform an input voice in the first language spoken by a non-native speaker into a first phonological awareness feature amount sequence for the first language, wherein the first phonological awareness feature amount sequence represents a first sequence of feature amounts in a multidimensional vector form, and the first sequence of feature amounts includes information for identifying a phoneme in the first language;
receive, by a second model parameter group learning unit, a second voice data set uttered in a second language by a second speaker whose native language is the second language;
generate, by the second model parameter group learning unit, a second model parameter group associated with a second deep neural network;
use the second model parameter group to update the second deep neural network;
use the updated second deep neural network to transform the input voice into a second phonological awareness feature amount sequence for the second language, wherein the second phonological awareness feature amount sequence represents a second sequence of feature amounts in a multidimensional vector form, and the second sequence of feature amounts includes information for identifying a phoneme in the second language;
use, by a third model parameter group learning unit, the first model parameter group, the second model parameter group and a third voice data set to generate a third model parameter group associated with a third deep neural network, wherein the third voice data set is based on voice uttered in the first language by a third speaker whose native language is the second language; and
use the third model parameter group to update the third deep neural network, wherein the updated third deep neural network is used to transform the input voice into a posterior probability sequence for phonemes in the first language, and wherein the posterior probability sequence is used to recognize the input voice.

2. The device according to claim 1, wherein the at least one memory includes further instructions that, when executed by the at least one processor, further cause the device to:
transform an acoustic feature amount sequence of the input voice into the phonological awareness feature amount sequence for the first language using the first model parameter group;
transform the acoustic feature amount sequence of the input voice into the phonological awareness feature amount sequence for the second language using the second model parameter group;
generate the posterior probability sequence from the acoustic feature amount sequence of the input voice, the phonological awareness feature amount sequence for the first language, and the phonological awareness feature amount sequence for the second language using the third model parameter group; and
perform voice recognition based on the posterior probability sequence to output text of a voice recognition result.

3. A method for learning a parameter used for voice recognition of input voice, comprising:
receiving, by a first model parameter group learning unit, a first voice data set uttered in a first language by a first speaker whose native language is the first language;
generating, by the first model parameter group learning unit, a first model parameter group associated with a first deep neural network;
using the first model parameter group to update the first deep neural network;
using the updated first deep neural network to transform the input voice in the first language spoken by a non-native speaker into a first phonological awareness feature amount sequence for the first language, wherein the first phonological awareness feature amount sequence represents a first sequence of feature amounts in a multidimensional vector form, and the first sequence of feature amounts includes information for identifying a phoneme in the first language;

receiving, by a second model parameter group learning unit, a second voice data set uttered in a second language by a second speaker whose native language is the second language;

generating, by the second model parameter group learning unit, a second model parameter group associated with a second deep neural network;

using the second model parameter group to update the second deep neural network;

using the updated second deep neural network to transform the input voice into a second phonological awareness feature amount sequence for the second language, wherein the second phonological awareness feature amount sequence represents a second sequence of feature amounts in the multidimensional vector form, and the second sequence of feature amounts includes information for identifying a phoneme in the second language;

using, by a third model parameter group learning unit, the first model parameter group, the second model parameter group and a third voice data set to generate learning a third model parameter group associated with a third deep neural network, wherein the third voice data set is based on voice uttered in the first language by a third speaker whose native language is the second language; and using the third model parameter group to update the third deep neural network, wherein the updated third deep neural network is used to transform the input voice into a posterior probability sequence for phonemes in the first language, and wherein the posterior probability sequence is used to recognize the input voice.

4. The method according to claim 3, further comprising:
transforming an acoustic feature amount sequence of the input voice into the phonological awareness feature amount sequence for the first language using the first model parameter group;
transforming the acoustic feature amount sequence of the input voice into the phonological awareness feature amount sequence for the second language using the second model parameter group;
generating the posterior probability sequence from the acoustic feature amount sequence of the input voice, the phonological awareness feature amount sequence for the first language, and the phonological awareness feature amount sequence for the second language using the third model parameter group; and
performing voice recognition based on the posterior probability sequence to output text of a voice recognition result.

5. A non-transitory computer readable recording medium storing one or more programs, the one or more programs comprising instructions, which when executed by one or more processors of a device, cause the device to:
receive, by a first model parameter group learning unit, a first voice data set uttered in a first language by a first speaker whose native language is the first language;
generate, by the first model parameter group learning unit, a first model parameter group associated with a first deep neural network;
use the first model parameter group to update the first deep neural network;

use the updated first deep neural network to transform an input voice in the first language spoken by a non-native speaker into a first phonological awareness feature amount sequence for the first language, wherein the first phonological awareness feature amount sequence represents a first sequence of feature amounts in a multidimensional vector form, and the first sequence of feature amounts includes information for identifying a phoneme in the first language;

receive, by a second model parameter group learning unit, a second voice data set uttered in a second language by a second speaker whose native language is the second language;

generate, by the second model parameter group learning unit, a second model parameter group associated with a second deep neural network;

use the second model parameter group to update the second deep neural network;

use the updated second deep neural network to transform the input voice spoken in the first language into a second phonological awareness feature amount sequence for the second language, wherein the second phonological awareness feature amount sequence represents a second sequence of feature amounts in the multidimensional vector form, and the second sequence of feature amounts includes information for identifying a phoneme in the second language;

use, by a third model parameter group learning unit, the first model parameter group, the second model parameter group and a third voice data set to generate a third model parameter group associated with a third deep neural network, wherein the third voice data set is based on voice uttered in the first language by a third speaker whose native language is the second language; and use the third model parameter group to update the third deep neural network, wherein the updated third deep neural network is used to transform the input voice in the first language spoken by a non-native speaker into a posterior probability sequence for phonemes in the first language, and wherein the posterior probability sequence is used to recognize the input voice spoken in the first language.

6. The non-transitory computer readable recording medium of claim 5, wherein the one or more programs further comprise instructions, which when executed by the one or more processors, cause the device to:
transform an acoustic feature amount sequence of the input voice into the phonological awareness feature amount sequence for the first language using the first model parameter group;
transform the acoustic feature amount sequence of the input voice into the phonological awareness feature amount sequence for the second language using the second model parameter group;
generate the posterior probability sequence from the acoustic feature amount sequence of the input voice, the phonological awareness feature amount sequence for the first language, and the phonological awareness feature amount sequence for the second language using the third model parameter group; and
perform voice recognition based on the posterior probability sequence to output text of a voice recognition result.

* * * * *